United States Patent
Hunt et al.

(10) Patent No.: US 10,533,608 B2
(45) Date of Patent: Jan. 14, 2020

(54) RING SEAL FOR LIQUID METAL BEARING ASSEMBLY

(71) Applicant: General Electric Company, Schenectady, NY (US)

(72) Inventors: Ian Strider Hunt, Milwaukee, WI (US); Andrew Thomas Triscari, Milwaukee, WI (US); Donald Allen, Waukesha, WI (US); Gregory Steinlage, Milwaukee, WI (US); Michael Scott Hebert, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 412 days.

(21) Appl. No.: 15/426,879

(22) Filed: Feb. 7, 2017

(65) Prior Publication Data

US 2018/0223908 A1    Aug. 9, 2018

(51) Int. Cl.
*F16C 33/72* (2006.01)
*F16C 32/06* (2006.01)
*H01J 35/16* (2006.01)

(52) U.S. Cl.
CPC .............. *F16C 33/72* (2013.01); *F16C 32/06* (2013.01); *H01J 35/16* (2013.01); *F16C 2380/16* (2013.01)

(58) Field of Classification Search
None
See application file for complete search history.

(56) References Cited

U.S. PATENT DOCUMENTS

| 5,189,688 A | 2/1993 | Ono et al. |
| 5,195,119 A | 3/1993 | Ono et al. |

(Continued)

FOREIGN PATENT DOCUMENTS

| DE | 19606871 | 8/1997 |
| DE | 197 33 337 A1 | 2/1999 |

(Continued)

OTHER PUBLICATIONS

Extended European Search Report and Opinion issued in connection with corresponding EP Application No. 18154704.3 dated Oct. 30, 2018.

*Primary Examiner* — Hoon K Song
(74) *Attorney, Agent, or Firm* — Boyle Fredrickson, S.C.

(57) ABSTRACT

A ring seal is engaged with a liquid metal bearing assembly and operates to contain metal fluid lubricant leaking through the primary compression seals of a liquid metal bearing to prevent the fluid from entering the high voltage space within the x-ray tube and causing high voltage instability. The ring seal engages the existing configuration for the bearing assembly without deforming the bearing, including effects of thermal expansion and inertial body forces, thus maintaining the tight tolerances for the proper operation of the component parts of the bearing structure. The ring seal retains the leaking liquid metal within the ring seal regardless of the operating state and/or condition of the bearing assembly, such as during operating conditions. i.e., rotation of the bearing assembly or gantry, and non-operating conditions, e.g., shipping and stand-by, and regardless of the corresponding pressures and their locations exerted on the ring seal by the liquid metal.

19 Claims, 8 Drawing Sheets

(56) References Cited

U.S. PATENT DOCUMENTS

| | | | |
|---|---|---|---|
| 5,210,781 A | 5/1993 | Ono et al. | |
| 5,701,336 A | 12/1997 | Jacob | |
| 6,477,236 B1 * | 11/2002 | Anno | H01J 35/105 378/127 |
| 7,672,434 B2 | 3/2010 | Saint-Martin et al. | |
| 2004/0056428 A1 | 3/2004 | Yoshida | |
| 2007/0009095 A1 | 1/2007 | Turaga et al. | |
| 2012/0106712 A1 | 5/2012 | Hunt et al. | |
| 2016/0133431 A1 | 5/2016 | Hunt et al. | |

FOREIGN PATENT DOCUMENTS

| | | |
|---|---|---|
| EP | 0707336 | 4/1996 |
| EP | 0966019 | 12/1999 |
| JP | 2003-217492 | 7/2003 |
| WO | 2011128816 | 10/2011 |
| WO | 2016077049 | 5/2016 |

\* cited by examiner

RING SEAL FOR LIQUID METAL BEARING ASSEMBLY

BACKGROUND OF THE INVENTION

The invention relates generally to x-ray tubes, and more particularly to structures and methods of assembly to mitigate leakage from a liquid metal bearing utilized in an x-ray tube.

X-ray systems may include an x-ray tube, a detector, and a support structure for the x-ray tube and the detector. In operation, an imaging table, on, which an object is positioned, may be located between the x-ray tube and the detector. The x-ray tube typically emits radiation, such as x-rays, toward the object. The radiation passes through the object on the imaging table and impinges on the detector. As radiation passes through the object, internal structures of the object cause spatial variances in the radiation received at the detector. The detector then emits data received, and the system translates the radiation variances into an image, which may be used to evaluate the internal structure of the object. The object may include, but is not limited to, a patient in a medical imaging procedure and an inanimate object as in, for instance, a package in an x-ray scanner or computed tomography (CT) package scanner.

X-ray tubes include a cathode and an anode located within a high-vacuum environment. In many configurations, the anode structure is supported by a liquid metal bearing structure, e.g., a spiral groove bearing (SGB) structure, formed with a support shaft disposed within a sleeve or shell to which the anode is attached and that rotates around the support shaft. The spiral groove bearing structure also includes spiral or helical grooves on various surfaces of the sleeve or shell that serve to take up the radial and axial forces acting on the sleeve as it rotates around the support shaft.

Typically, an induction motor is employed to rotate the anode, the induction motor having a cylindrical rotor built into an axle formed at least partially of the sleeve that supports the anode target and an iron stator structure with copper windings that surrounds an elongated neck of the x-ray tube. The rotor of the rotating anode assembly is driven by the stator. The x-ray tube cathode provides a focused electron beam that is accelerated across an anode-to-cathode vacuum gap and produces x-rays upon impact with the anode. Because of the high temperatures generated when the electron beam strikes the target, it is necessary to rotate the anode assembly at high rotational speed. This places stringent demands on the bearings and the material forming the anode structure, i.e., the anode target and the shaft supporting the target.

Advantages of liquid metal bearings such as spiral groove bearings in x-ray tubes include a high load capability and a high heat transfer capability due to an increased amount of contact area. Other advantages include low acoustic noise operation as is commonly understood in the art. Gallium, indium, or tin alloys are typically used as the liquid metal in the bearing structure, as they tend to be liquid at room temperature and have adequately low vapor pressure, at operating temperatures, to meet the rigorous high vacuum requirements of an x-ray tube.

One issue prevalent in liquid metal bearing designs is that the liquid metal utilized in the bearing can leak out of various locations of the bearing as a result of the flowability of the liquid metal. Further, as a result of the forces exerted on the bearing and liquid metal contained therein during the operation of the x-ray tube and consequent rotation of the bearing, the liquid metal can be urged out of the bearing by these forces. Any liquid metal that leaks out of the bearing structure can cause significant issues regarding the operation of the x-ray tube, including, but not limited to, high voltage instability as a result of the leaked liquid metal being present within the high voltage fields within the x-ray tube.

Liquid metal bearings are manufactured by the joining of multiple parts to form journal and thrust bearings with liquid metal covering all, or most, of the internal surfaces. The liquid metal inside of the bearing can be pressurized at the joints of the bearing parts due to several reasons. For example, the integral of the force of gravity pulling on the fluid across the bearing can create pressure, even when the bearing is not rotating. Further, when the bearing is rotating, inertial forces acting on the liquid metal due to the rotation of the rotating parts of the bearing can create large pressures (60 psi for example). Finally, whether the bearing is rotating, or not, the rotation of a gantry (CT or interventional) can create pressure on the liquid metal as well due to inertial forces resulting in pressures on the order of 1 psi. Further, in addition to the difference in pressures, the pressures can be created in different locations within the bearing.

Thus, the seals between the bearing parts must be able to contain the liquid metal during all conditions of operation or non-operation of the bearing otherwise the liquid metal bearing fluid can leak out of the bearing and enter the high voltage fields, causing high voltage instabilities.

The seals of liquid metal bearings can be divided into three categories: 1) a seal between two rotating components; 2) a seal between two stationary components; and 3) a seal between one stationary and one rotating component. A primary leakage path in a liquid metal bearing is through the seals located between two rotating components, in which the parts are joined together and rotating at the angular speed of the target. The most common design for a seal of this type, as shown in FIGS. 1 and 2, in a prior art anode assembly 208 is a capillary seal 210 formed by clamped, smooth, flat surfaces 212-218 of the liquid metal bearing 220 formed on a journal bearing 222, a thrust bearing 224 and a spacer 226 disposed between the journal bearing 222 and the thrust bearing 224. The journal bearing 222, thrust bearing 224 and spacer 226 are joined by various bolts 228 that are inserted into and/or through various combinations of the journal bearing 222, thrust bearing 224 and spacer 226 to secure the components of the liquid metal bearing 220 to one another. The adjacent surfaces 212-218 formed on the journal bearing 222, thrust bearing 224 and spacer 226 are coated with an anti-wetting coating in order to repel any liquid metal contacting these surfaces 212-218 to form the seals 210 and maintain the liquid metal 228 within the gap 230 formed within bearing 220. However, as seen in FIG. 2, if a seal 210 is defective due to such things as imperfect geometry, insufficient clamp loads, or contaminated seal surfaces, the fluid can leak past the seal 210, through the bearing 220, such as along a bolt 232, and into the high voltage space 234 of the X-ray tube.

To attempt to address this type of liquid metal leakage, a bearing can be formed utilizing components formed of weldable materials that are welded shut to create more robust primary seals. However, this required different materials for the formation of the bearing assembly that, have lower temperature limits, and are unsuitable for use in many x-ray tubes.

Alternatively, the bearing assembly can be designed to have lower internal pressures to lessen the forces urging the liquid metal out of the bearing, for example by operating the assembly with reduced speed, or forming the bearing in smaller sizes. However, this solution has tradeoffs in bearing, X-ray tube and/or system performance, as these alterations to the bearing result in lower power limits or gantry speeds, which is undesirable.

As a result, it is desirable to develop a structure and method for use of a sealing member or ring for a bearing assembly or structure of an x-ray tube that is designed to trap and/or retain liquid metal within the bearing at different operational states of the bearing and to minimize any structural alteration or deformation of the bearing when in use.

BRIEF DESCRIPTION OF THE INVENTION

In the invention, a liquid retaining device for a liquid metal bearing, i.e., a spiral groove bearing, referred to as a ring seal is employed with an existing bearing assembly or structure. The ring seal operates to contain metal fluid lubricant leaking through the primary compression seals of a liquid metal bearing to prevent the fluid from entering the high voltage space within the x-ray tube and causing high voltage instability. The ring seal or member is designed to be tightly joined to and engage the existing configuration for the bearing assembly or structure without deforming the bearing, including the effects of thermal expansion and inertial body forces, thus maintaining the tight tolerances for the proper operation of the component parts of the bearing structure.

In order to provide an adequate seal to maintain the liquid metal within the bearing assembly or structure, the ring seal covers the locations where the liquid is escaping. Thus, the ring seal is positioned on the bearing structure over the apertures in the bearing structure through which the liquid metal leaks in prior art bearing assembly designs. Further, the configuration of the ring seal does not create new locations or pathways for leakage of the liquid metal through the ring seal and can retain the leaking liquid metal within the ring seal regardless of the operating state and/or condition of the bearing assembly, such as during operating conditions, i.e., rotation of the bearing assembly or gantry, and non-operating conditions, e.g., shipping and stand-by, and regardless of the corresponding pressures and their locations exerted on the ring seal by the liquid metal.

The ring seal also provides a trap within the ring seal capable of containing up to the total volume of liquid, that can be lost from the bearing structure. Liquid metal bearings do not require significantly large volumes of liquid metal to function, but often require larger volumes of liquid metal than necessary for operation in order to build them. The trap portion of the ring seal for containing any leaked liquid metal is configured such that the liquid metal within the trap does not self-generate high pressures from inertial forces, such as to cause further leaks out of the ring seal when an amount of liquid metal is trapped therein.

Therefore, in certain exemplary embodiments of the invention. the ring seal can function to prolong the life of an X-ray tube by avoiding high voltage instabilities due to leaked liquid metal while able to be added to existing bearing designs with little modification, while also being easier to produce and manufacture than the requirements for the improvement of the primary seals within the bearing assembly.

In one exemplary embodiment a seal ring is presented that is configured to retain liquid metal leaking from a liquid metal bearing assembly of an x-ray tube. The seal ring comprises an inner deflection ring defining a central aperture adapted to receive a sleeve or shaft sleeve of the bearing assembly therethrough and an outer ring adapted to engage the sleeve. In at least one embodiment, the outer ring comprises a ligament adapted to retain liquid metal leaking from the bearing assembly therein within a trap defined within the outer ring.

In another exemplary embodiment, a liquid metal bearing assembly is presented that is configured to be used with an x-ray tube. The assembly comprises a sleeve, and a ring seal seated on the sleeve, the ring seal including an inner deflection ring defining a central aperture through which the sleeve extends and an outer ring defining a ligament for retaining liquid metal leaking from the bearing assembly. In at least one embodiment, the assembly further comprises a shaft rotatably disposed within the sleeve.

In still another exemplary embodiment, an x-ray tube is presented that comprises a frame defining an enclosure, a cathode assembly disposed in the enclosure and an anode assembly disposed in the enclosure spaced from the cathode assembly. The anode assembly includes a sleeve containing an amount of liquid metal therein, a shaft rotatably disposed within the sleeve, a ring seal engaged with the sleeve and adapted to retain leaking liquid metal therein when the shaft rotates within the sleeve and when the shaft is stationary within the sleeve, and an anode target operably connected to the sleeve.

In yet another exemplary embodiment, a method for forming a liquid metal bearing assembly of in an x-ray tube is presented. The method comprises the steps of providing a sleeve formed a journal bearing, a spacer and a thrust bearing, placing an amount of a liquid metal bearing fluid into the journal bearing, inserting a shaft into the journal bearing, securing the spacer and the thrust bearing to the journal bearing around the shaft, and securing a ring seal to the sleeve. In at least one embodiment, the ring seal is secured to at least one of the journal bearing or the thrust bearing.

It should be understood that the brief description, including all embodiments as set forth above, is provided to introduce in simplified form a selection of concepts that are further described in the detailed description. It is not meant to identify key or essential features of the presented subject matter or limit its scope which is defined uniquely by the claims that follow the detailed description. Furthermore, the claimed subject matter is not limited to implementations that solve any disadvantages noted above or in any part of this disclosure.

DETAILED DESCRIPTION OF THE INVENTION

Figure 1:
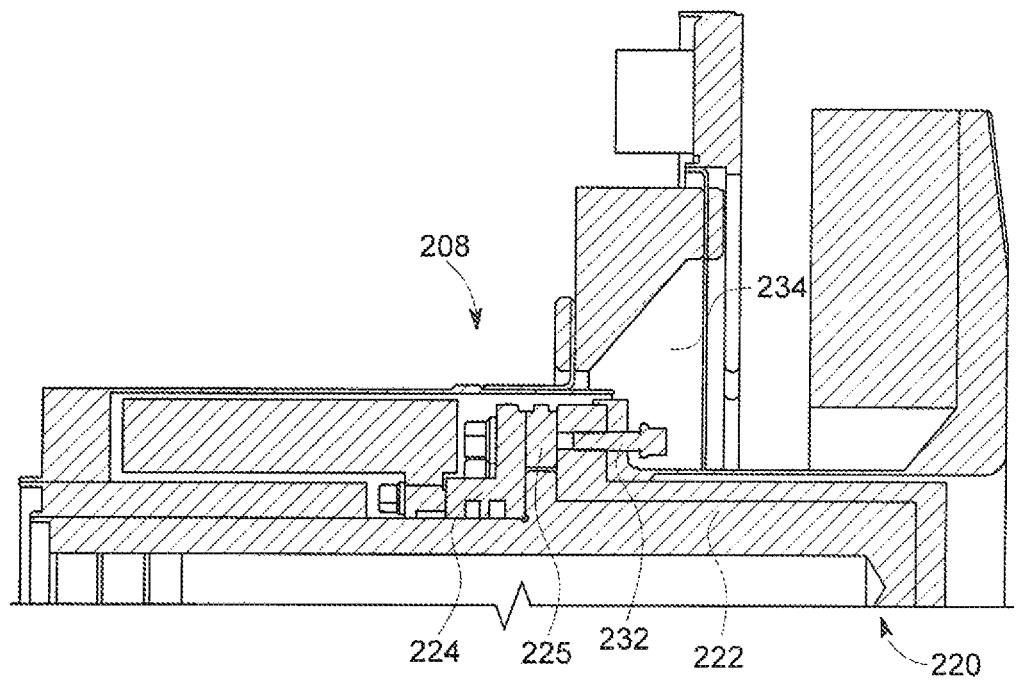
FIG. 1 is a cross-sectional view of a portion of a prior art anode assembly of an x-ray tube including a liquid metal bearing assembly.
Figure 2:
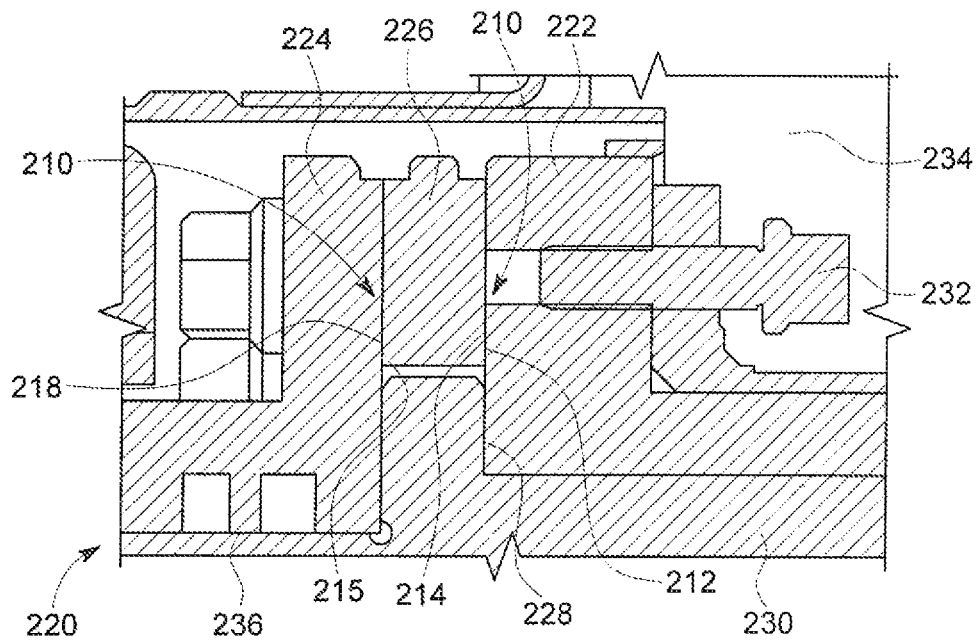
FIG. 2 is partially broken away, cross-sectional view of the prior art liquid metal bearing assembly of FIG. 1.
Figure 3:
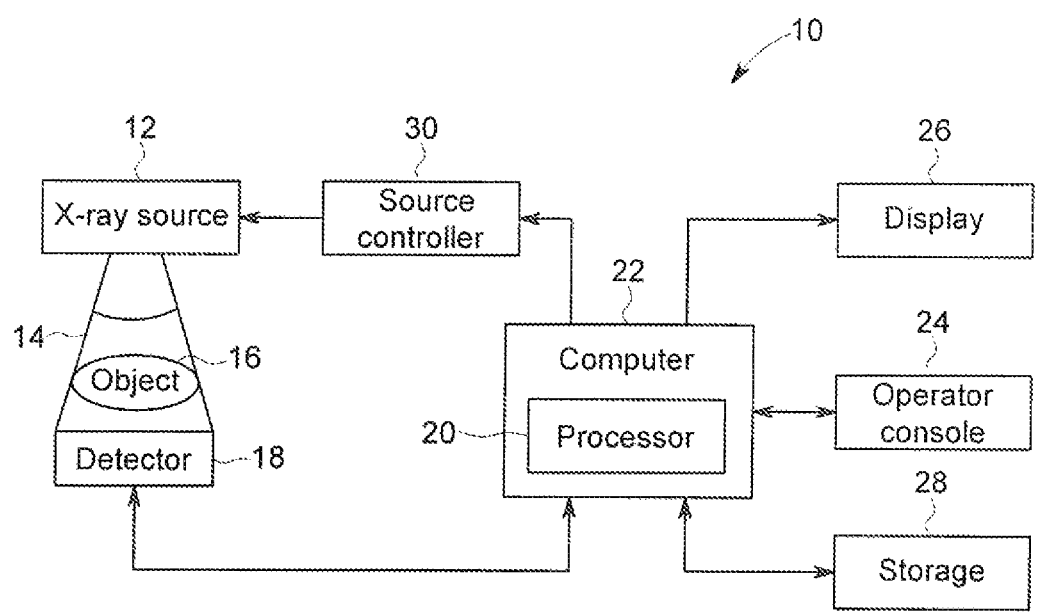
FIG. 3 is a block diagram of an imaging system incorporating exemplary embodiments of the invention.

FIG. 3 is a block diagram of an embodiment of an imaging system 10 designed both to acquire original image data and to process the image data for display and/or analysis in accordance with embodiments of the invention. It will be appreciated by those skilled in the art that various embodiments of the invention are applicable to numerous medical imaging systems implementing an x-ray tube, such as x-ray or mammography systems. Other imaging systems such as computed tomography (CT) systems and digital radiography (RAD) systems, which acquire image three dimensional data for a volume, also benefit from the invention. The following discussion of x-ray system 10 is merely an example of one such implementation and is not intended to be limiting in terms of modality.

As shown in FIG. 3, imaging system 10 includes an x-ray tube or source 12 configured to project a beam of x-rays 14 through an object 16. Object 16 may include a human subject, pieces of baggage, or other objects desired to be scanned. X-ray source 12 may be conventional x-ray tubes producing x-rays 14 having a spectrum of energies that range, typically, from thirty (30) keV to two hundred (200) keV. The x-rays 14 pass through object 16 and, after being attenuated, impinge upon a detector assembly 18. Each detector module in detector assembly 18 produces an analog electrical signal that represents the intensity of an impinging x-ray beam, and hence the attenuated beam, as it passes through the object 16. In one embodiment, detector assembly 18 is a scintillation based detector assembly, however, it is also envisioned that direct-conversion type detectors (e.g., CZT detectors, etc.) may also be implemented.

A processor 20 receives the signals from the detector 18 and generates an image corresponding to the object 16 being scanned. A computer 22 communicates with processor 20 to enable an operator, using operator console 24, to control the scanning parameters and to view the generated image. That is, operator console 24 includes some form of operator interface, such as a keyboard, mouse, voice activated controller, or any other suitable input apparatus that allows an operator to control the x-ray system 10 and view the reconstructed image or other data from computer 22 on a display unit 26. Additionally, console 24 allows an operator to store the generated image in a storage device 28 which may include hard drives, floppy discs, compact discs, etc. The operator may also use console 24 to provide commands and instructions to computer 22 for controlling a source controller 30 that provides power and timing signals to x-ray source 12.

Figure 4:
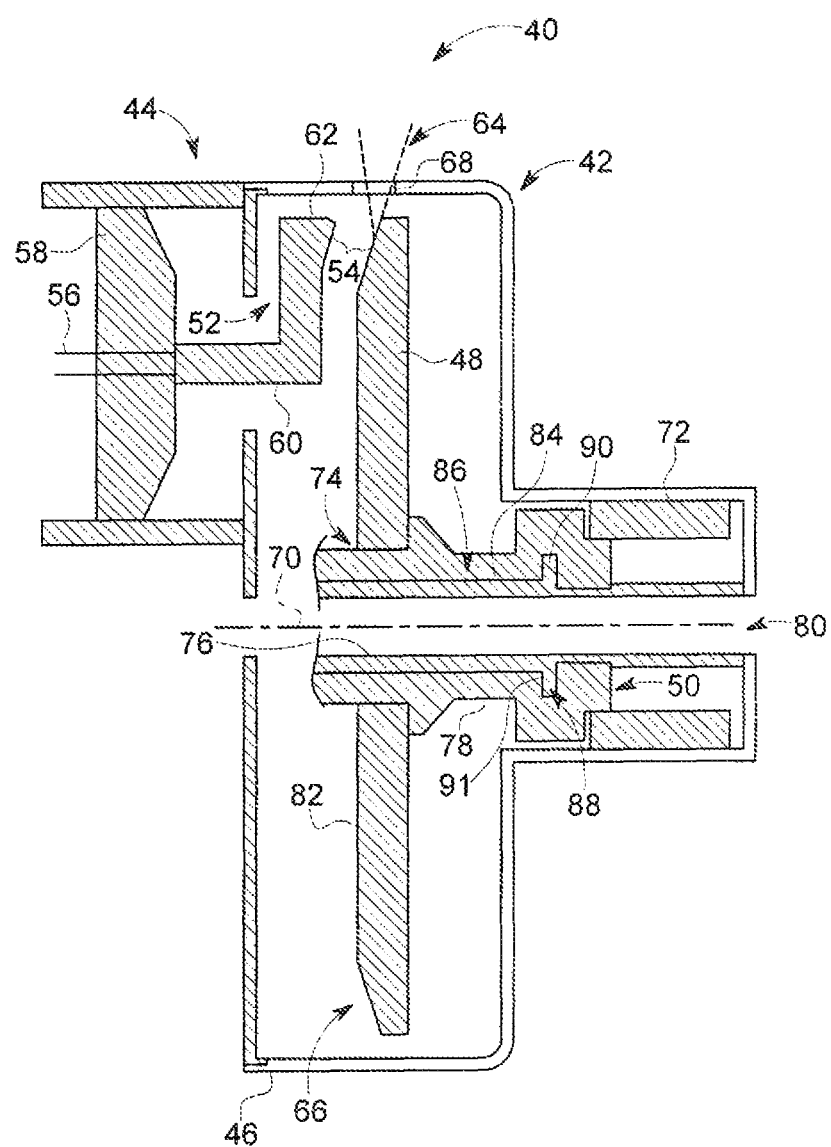
FIG. 4 is a cross-sectional view of a portion of an x-ray tube according to an exemplary embodiment of the invention and usable with the system illustrated in FIG. 3.

FIG. 4 illustrates a cross-sectional view of an x-ray source 12 incorporating embodiments of the invention. in the illustrated embodiment, x-ray source 12 is formed of an x-ray tube 40 that includes an anode assembly 42 and a cathode assembly 44. X-ray tube 40 is supported by the anode and cathode assemblies 42, 44 within an envelope or frame 46, which houses a target or anode 48, a bearing assembly 50, and a cathode 52. Frame 46 defines an area of relatively low pressure (e.g., a vacuum) 30 compared to ambient, in which high voltages may be present. Frame 46 may be positioned within a casing (not shown) filled with a cooling medium, such as oil, that may also provide high voltage insulation. While the target and anode are described above as being a common component of x-ray tube 40, the target and anode may be separate components in alternative x-ray tube embodiments.

In operation, an electron beam 54 is produced by cathode assembly 44. In particular, cathode 52 receives one or more electrical signals via a series of electrical leads 56. The electrical signals may be timing/control signals that cause cathode 52 to emit electron beam 54 at one or more energies and at one or more frequencies. The electrical signals may also at least partially control the potential between cathode 52 and anode 48. Cathode 52 includes a central insulating shell 58 from which a mask 60 extends. Mask 60 encloses electrical leads 56, which extend to a cathode cup 62 mounted at the end of mask 60. In some embodiments, cathode cup 62 serves as an electrostatic lens that focuses electrons emitted from a thermionic filament within cathode cup 62 to form electron beam 54.

X-rays 64 are produced when high-speed electrons of electron beam 54 are suddenly decelerated when directed from the cathode 52 to a target or focal surface 66 formed on target 48 via a potential difference therebetween of, for example, sixty (60) thousand volts or more in the case of CT applications. The x-rays 64 are emitted through a radiation emission passage 68 formed in frame 46 toward a detector array, such as detector 18 of FIG. 3.

Anode assembly 42 includes a rotor 72 and a stator (not shown) located outside x-ray source 40 and partially surrounding rotor 72 for causing rotation of anode 48 during operation. Target 48 is supported in rotation by a bearing assembly 50, which, when rotated, also causes target 48 to rotate about the centerline 70. As shown, target 48 has a generally annular shape, such as a disk, and cylindrical channel 74 extending axially and outwardly away from the center thereof for receiving bearing assembly 50 therein.

Target 48 may be manufactured to include a number of metals or composites, such as tungsten, molybdenum, copper, or any material that contributes to Bremsstrahlung (i.e., deceleration radiation) when bombarded with electrodes. Target or focal surface 66 of target 48 may be selected to have a relatively high refractory value so as to withstand the heat generated by electrons impacting target 48. Further, the space between cathode assembly 44 and target 48 may be evacuated in order to minimize electron collisions with other atoms and to maximize an electric potential.

To avoid overheating of the target 48 when bombarded by the electrons, rotor 72 rotates target 48 at a high rate of speed (e.g., 90 to 250 Hz) about a centerline 70. In addition to the rotation of target 48 within x-ray tube volume 46, in a CT application, the x-ray source 40 as a whole is caused to rotate about an object, such as object 16 of imaging system 10 in FIG. 3, at rates of typically 1 Hz or faster.

Bearing assembly 50 can be formed as necessary, such with a number of suitable ball bearings (not shown), but in the illustrated exemplary embodiment comprises a liquid lubricated or self-acting bearing having adequate load-bearing capability and acceptable acoustic noise levels for operation within imaging system 10 of FIG. 3. As used herein, the terms "self-acting" and "self-lubricating" mean that the bearing lubricant remains distributed on the surfaces of the bearing due to the relative motion of the bearing components and absent an external pump.

In general, bearing assembly 50 includes a stationary portion, such as center shaft 76, and a rotating portion, such as shell 78 to which the target 48 is attached. While center shaft 76 is described with respect to FIG. 4 as the stationary portion of bearing assembly 50 and shell 78 is described as the rotating portion of bearing assembly 50, embodiments of the present invention are also applicable to embodiments wherein center shaft 76 is a rotary shaft and shell 78 is a stationary component. In such a configuration, target 48 would rotate as center shaft 76 rotates.

Center shaft 76 may optionally include a cavity or coolant flow path 80 though which a coolant (not shown), such as oil, may flow to cool bearing assembly 50. As such, coolant enables heat generated from target 48 of x-ray source 40 (FIG. 4) to be extracted, therefrom and transferred external to x-ray source 40. In straddle mounted x-ray tube configurations, coolant flow path 80 extends along a longitudinal length of x-ray source 40. In alternative embodiments, coolant flow path 80 may extend through only a portion of x-ray source 40, such as in configurations where x-ray source 40 is cantilevered when placed in an imaging system.

Figure 5:
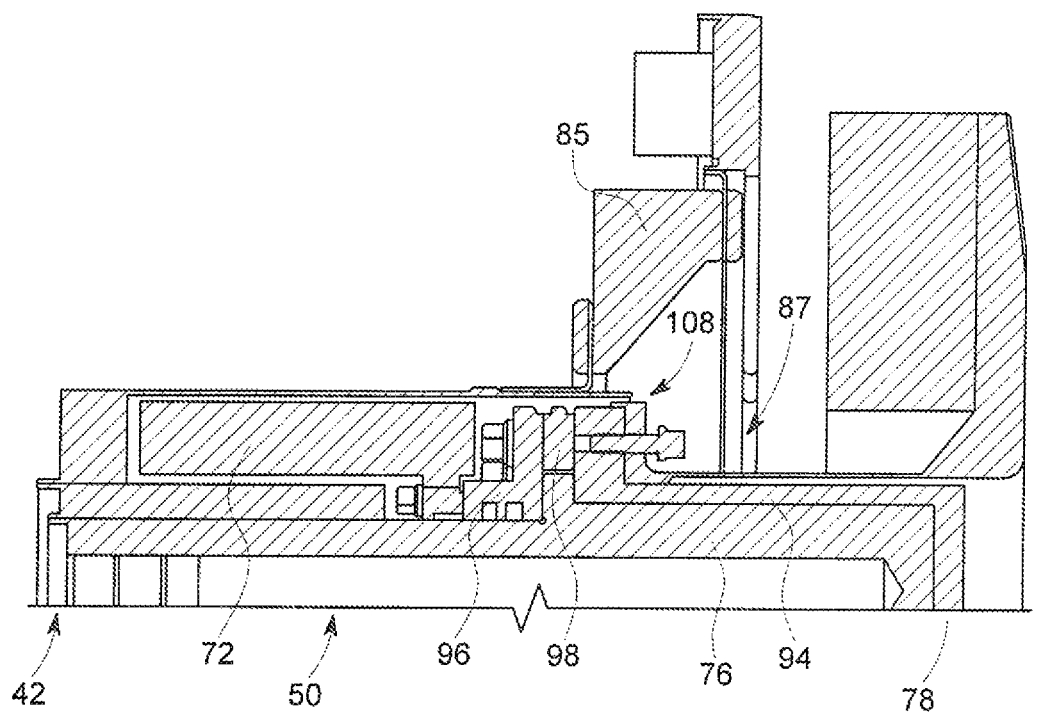
FIG. 5 is a cross-sectional side plan view of an anode assembly and bearing assembly structure of an x-ray tube in accordance with an exemplary embodiment of the invention.
Figure 6:
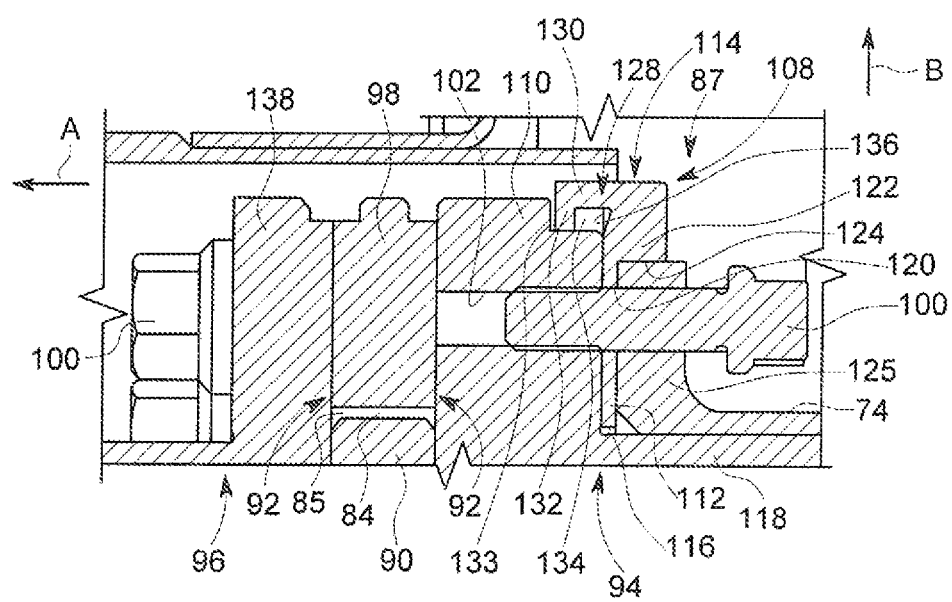
FIG. 6 is a partially broken-away, cross-sectional view of the bearing assembly and the ring seal in accordance with an exemplary embodiment of the invention.

Referring now to FIGS. 5-6, a cross-sectional view of a portion of bearing assembly or structure 50 is shown according to an embodiment of the invention. Bearing assembly 50 includes a center shaft 76 positioned within shell 78, which is configured to support an anode 82 such as target 48 of FIG. 4. A lubricant 84 is positioned in a gap 86 formed between center shaft 76 and shell 78. In embodiments of the invention, lubricant 84 is a metal or metallic alloy that exists in a liquid or fluid state at operating temperature of bearing assembly 50.

The lubricating fluid 84 flowing between the rotating and stationary components of the bearing assembly or structure 50 may include a variety of individual fluids as well as mixtures of fluids. For example, multiple liquid metals and liquid metal alloys may be used as the lubricating fluid, such as an indium gallium alloy. More generally, fluids with relatively low vapor pressures that are resistant to evaporation in vacuum-level pressures of the x-ray tube may be used. In the present context. low vapor pressures may generally be in the range of $1 \times 10^{-5}$ Torr. In other words, fluids that are stable in vacuums are desirable for use in x-ray tube systems so as to not adversely affect the established vacuum during operation of the system. In the present disclosure, lubricant 84 may be gallium or a gallium alloy as non-limiting examples.

In the embodiment illustrated in FIG. 5, center shaft 76 of bearing assembly 50 is a stationary component and shell 78 is a rotatable component constructed to rotate about center shaft 76 in order to rotate the target 48/anode 82, which spaced from an insulator 85 and defines a high voltage space 87 therebetween. However, one skilled in the art will recognize the inventive concepts described herein are applicable to alternative bearing configurations. As one example, bearing assembly 50 may instead include a stationary outer component and a rotating center shaft having a target attached thereto. As another example, bearing assembly 50 may he a "straddle" bearing that is configured to support a target between a first and a second liquid metal bearing. In other words, embodiments of this invention may be incorporated into any bearing configuration utilizing a liquid lubricated bearing to support an anode or target. Such configurations may include a stationary center shaft and a rotatable outer shaft, and vice versa. Further, one skilled in the art will recognize that such applications need not be limited to x-ray tubes, but may be applied to any configuration having a rotating component in a vacuum, the rotating component being supported by a liquid lubricated bearing. Thus, this invention is applicable to any bearing configuration having a rotatable component and a stationary component, and a liquid lubricant therebetween, regardless of configuration or application.

As illustrated in FIGS. 3-6, center shaft 76 of bearing assembly 50 includes a thrust bearing portion 88 comprising a radial projection 90 that extends from center shaft 76 and is positioned in a radial cavity 91 of shell 78. Various coatings, textures, and patterns including grooves embedded in the contacting surfaces of bearing assembly 50 may be applied to alter bearing behavior as the shall 76 and shell 78 rotate relative to each other.

Bearing assembly or structure 50 may be referred to as a spiral groove bearing (SGB) due to the patterning of grooves along the various surfaces of the bearing. In some examples, the spiral groove may be formed from a logarithmic spiral shape. The spiral groove bearing may also be equivalently referred to as a fluid dynamic bearing and liquid bearing as well.

In the bearing assembly 50, compression seals 92 employing capillary forces are utilized to restrict the, flow of the lubricant 84, wherein the small gap between two opposing bearing surfaces forming the compression seal 92 wets the fluid to retain the fluid within the gap 86. In other words, the anti-wetting properties of the surface (via texturing, coating, or both) aids in preventing the lubricant 84 from flowing in between the small gaps within the seals 92. In some examples, the surfaces are coated and/or textured to be more wetted such that the lubricant 84 clings in the small gap to reduce lubricant moving through the gap. In other examples, the surfaces are coated and/or textured to be more anti-wetting such that the lubricant is pushed away from the small gaps near the ends of the bearing assembly. In this context, the small gap in the compression seal 92 may be on the order of 0 to 10 um.

Operation of liquid bearings in x-ray tube systems, such as bearing assembly 50 of FIGS. 4 and 5, may be at least partially dependent on a tradeoff between load carrying capacity and fluid pumping force. In some examples, the load carrying capacity and fluid pumping force are inversely proportional and directly related to geometry of the bearing grooves. For example, given a substantially constant rotational speed of the liquid bearing, deeper grooves may provide a higher pumping force, while the increased clearance between the shaft and sleeve can reduce the load carrying ability of the bearing. Pumping force may be utilized to contain the lubrication fluid and anti-wetting coatings may be applied to sealing surfaces to further assist in containing the lubrication fluid.

The lubricating fluid in between bearing surfaces such as the shaft 76 and sleeve 78 are rotating relative to each other. As such, the lubricating fluid 84 is moved in a number of ways, including but not limited to, shearing, wedging, and squeezing, thereby creating pressures to lift and separate the shaft and sleeve from each other. This effect enables the liquid bearing to function and provide low-friction movement between the shaft and sleeve. In other words, shearing of the lubricating fluid imparts energy into the fluid which cases the fluid to pump, wherein the pumping action into the gap between the shaft and sleeve is how the liquid bearing functions. Energy transfer from the surfaces to the fluid enables bearing functionality. In application, in the context of the x-ray tube, wetting between some bearing surfaces and the lubricating fluid allows shearing to impact energy to the fluid.

Figure 7:
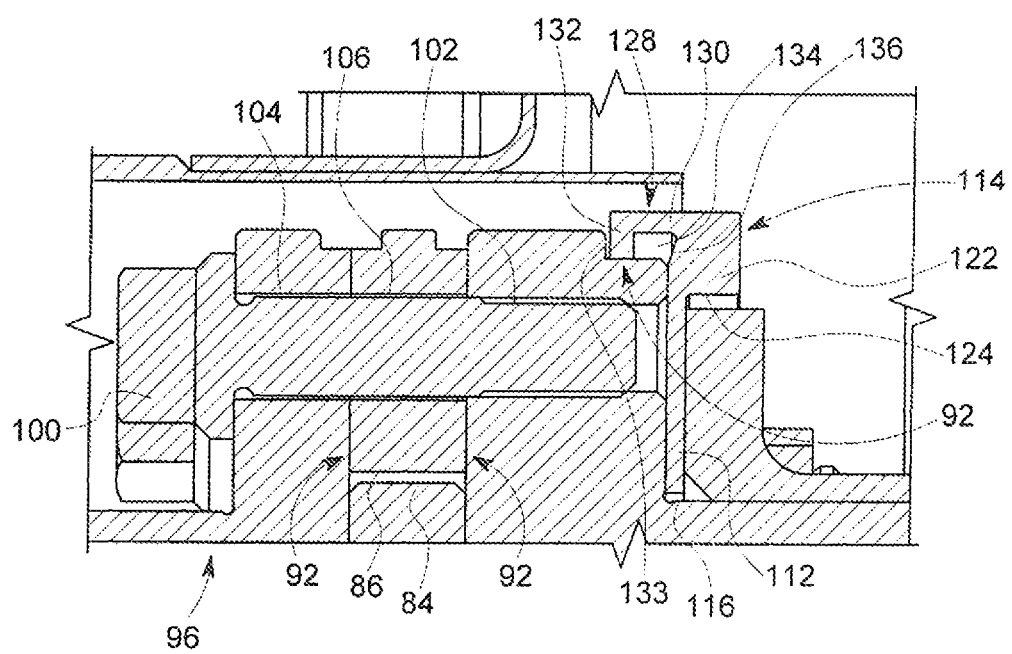
FIG. 7 is a partially broken-away, cross-sectional view of the bearing assembly and the ring seal in accordance with an exemplary embodiment of the invention.
Figure 8:
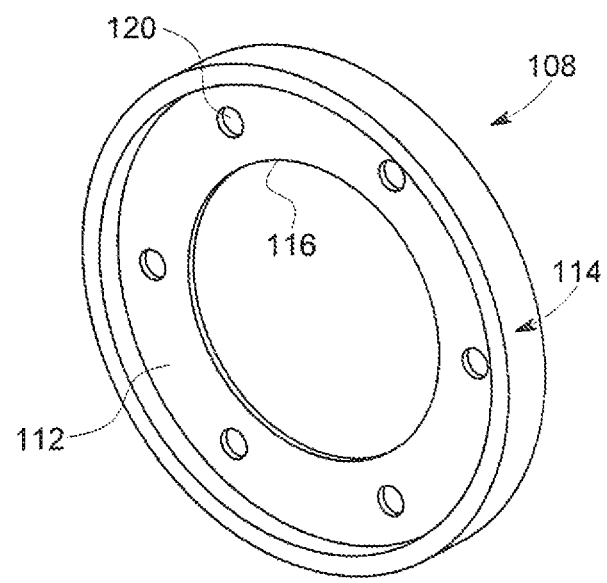
FIG. 8 is an isometric view of a ring seal, for the bearing assembly structure of FIG. 5 in accordance with an exemplary embodiment of the invention.
Figure 9:
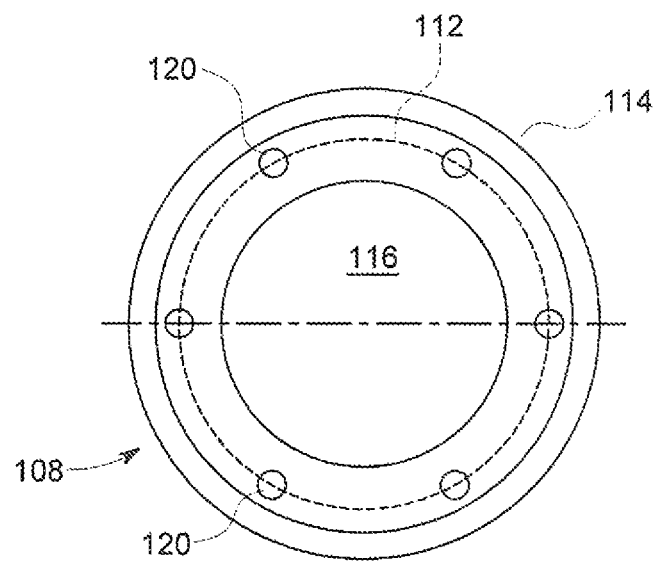
FIG. 9 is front plan view of the ring seal of FIG. 8 in accordance with an exemplary embodiment of the invention.
Figure 10:
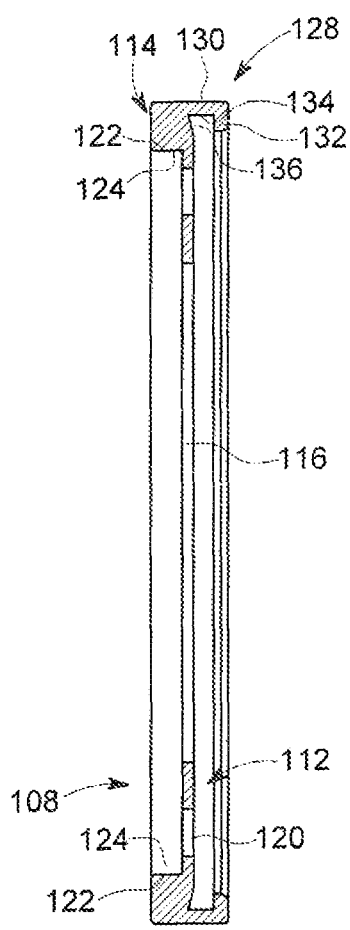
FIG. 10 is a cross-sectional view of the ring seal of FIG. 8 in accordance with an exemplary embodiment of the invention.
Figure 11:
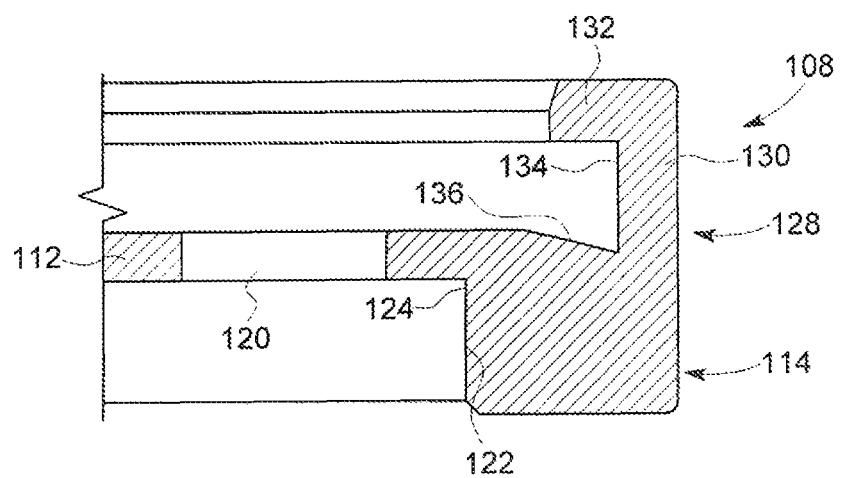
FIG. 11 is partially broken-away, cross-sectional of the ring seal of FIG. 8 in accordance with an exemplary embodiment of the invention.

In the exemplary embodiment of the invention illustrated in FIG. 5-7 the shell or sleeve 78 is formed with a 3-piece construction including a journal bearing 94, a thrust bearing 96 and a spacer 98 located between the journal bearing 94 and the thrust bearing 96 that combine to form the radial cavity 91 that receives the thrust bearing portion 88 of shaft 76. The surfaces of the journal bearing 94 and the thrust bearing 96 that contact the spacer 98 to form the compression seals 92. The journal bearing 94 and the thrust bearing 96 are engaged with one another and with the spacer 98 through the use of bolts 100 inserted through and engaged within aligned apertures 102, 104 and 106 in the journal bearing 94, thrust hearing 96 and spacer 98, respectively, as best shown in FIGS. 6-7.

In the exemplary embodiment of FIGS. 5 and 8-11, a ring seal 108 is positioned against a radial portion 110 of the journal bearing 94. The ring member or seal 108 is formed with an inner deflection ring 112, and an outer retaining ring 114. The inner deflection ring 112 extends inwardly from the outer ring 114 and defines a central aperture 116 therein that is aligned with the axial portion 118 of the journal bearing 94 and through which the axial portion 118 extends. The inner deflection ring 112 also includes a number of openings 120 spaced from one another around through circumference of the inner ring 112. The openings 120 are disposed in alignment with corresponding apertures 102 in the journal bearing 94 to enable the bolts 100 securing the cylindrical channel 74 of the target 48 or anode 82 to the journal bearing 94.

The outer retaining ring 114 includes a seating shoulder 122 that extends perpendicularly from the inner ring 112. The shoulder 122 defines a recess 124 adjacent the inner ring 112 that is lightly larger than the outer diameter of a seating flange 126 formed in the cylindrical channel 74 of the target 48 opposite the target 48. The recess 124 enables the ring seal 108 to seat between the radial portion 110 of the journal bearing 94 and the seating flange 126 with openings 120 aligned with the apertures 102 to enable the bolt 100 to be inserted to engage the flange 126 with the radial portion 110 and to hold the inner ring 112 therebetween such that the inner ring 112 can form a compression seal 92 with the radial portion 110. Further, due to the position of the inner ring 112 immediately over the leak pathways along the bolt 100 holding the cylindrical channel 74 of the target 48 to the journal bearing 94, the inner ring 112 can function as a deflection member for any leaking metal fluid in order to deflect or direct any leaking metal fluid along the inner ring 112 towards a fluid trap 134 formed within the ring seal 108, thus preventing the metal fluid from entering the high voltage area 87 adjacent the ring seal 108.

A ligament 128 extends outwardly from the outer retaining ring 114 perpendicularly to the inner ring 112 and defines an outer rim 130 that is formed as an extension of the retaining ring 114 and an inwardly radially extending arm 132 disposed on the ligament 128 opposite the retaining ring 114. The outer retaining ring 114 and the arm 132 and the rim 130 of the ligament 128 define a space or trap 134 therebetween, where the trap 134 is optionally formed with undercut 136. When positioned against the radial portion 110 of the journal bearing 94, the arm 132 engages the exterior of the radial portion 110 in order to provide a compression seal 92 between the arm 132 and the radial portion 110. Additionally, the inner ring 112 also engages the radial portion in the radial direction to forma compression seal 92 between the inner ring 112 and the radial portion 110. In the illustrated exemplary embodiment, the radial portion 110 of the journal bearing 94 is formed with a recess 133 that accommodates the arm 132 in order to allow the arm 132 to engage the radial portion 110 while positioning the outer rim 130 with sufficient clearance from the frame 46 to allow the bearing assembly 50 to freely rotate within the frame 46.

Figure 12:
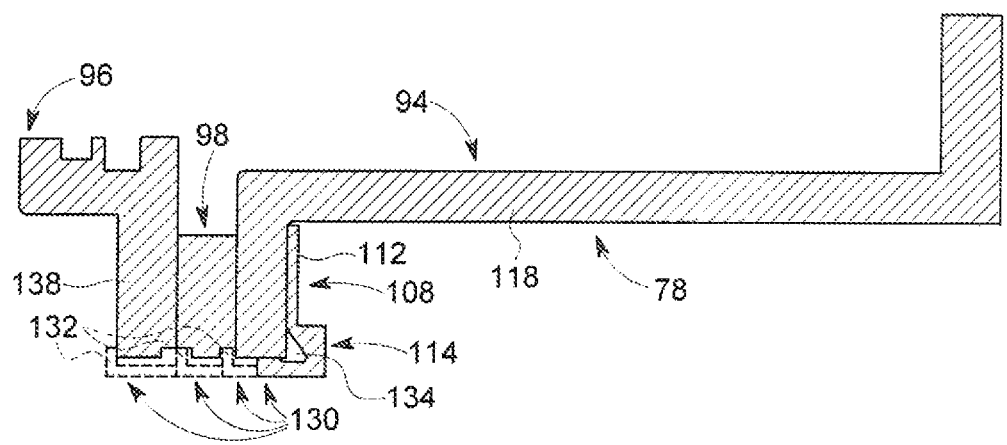
FIG. 12 is a cross-sectional view of the bearing assembly including a ring seal according to another exemplary embodiment of the invention.

In alternative exemplary embodiments, as shown in FIG. 12, the outer rim 130 can be formed to extend completely over the radial portion 110 of the journal bearing 94, such that the arm 132 is positioned in engagement with either side of the spacer 98 or with the thrust bearing 96 either adjacent or opposite the spacer 98. In these alternative exemplary embodiments, the arm 132 engages and forms a compression seal 92 with the particular component of the bearing assembly 50 with which it is engaged, such that additional leak pathways can be covered by the ring seal 108, if desired.

Further, in still another exemplary embodiment, the ring seal 108 can be positioned in engagement within a radial section 138 of the thrust bearing 96 in order to cover the potential leak pathways along the bolt 100 holding the thrust bearing 96 in engagement with the spacer 98 and/or the journal bearing 94. Further, separate ring seals 108 can he placed against both of the journal bearing 94 and the thrust bearing 96 to cover leak pathways that may occur in either direction along the bolts 100 holding the sleeve 78 together. In addition, the ligament 128 can be formed with arms 132 that vary in length, and/or with traps 134 having different interior configurations, as shown in FIG. 13.

In an exemplary embodiment of a method of assembling the bearing assembly or structure 50, initially an amount of the lubricant or liquid metal bearing fluid 84 is placed within the journal bearing 94. The shaft 76 is subsequently inserted into the journal bearing 94 to position the radial projection 90 against the radial portion 110 of the journal bearing 94. The spacer 98 and thrust bearing 96 are then positioned around the shaft 76 and journal bearing 94 and secured thereto utilizing the various bolts 100. Once secured, the ring seal 108 is engaged with the radial portion 110 of the journal bearing 94. In an alternative exemplary embodiment, the ring seal 108 can be engaged with the journal bearing 94 prior to placement of the shaft 76 within the journal bearing 94 or prior to the engagement of the spacer 98 and thrust seal 96 with the journal bearing 94.

in order to secure the ring seal 108 to the sleeve 78, or the journal bearing 94 in particular, as shown in FIGS. 5-7, the ring, seal 108 can be engaged with the journal bearing 94 (or the thrust bearing 96) to form an interference fit therebetween by press fitting the ring seal 108 onto the journal bearing 94, or by laser welding the ring seal 108 to the journal bearing 94. In any mode of securing the ring seal 108 to the journal bearing 94, the tolerance of the space remaining between the ring seal 108 and the journal bearing 94 is less than 10 microns. Further, in one exemplary embodiment of the invention, in order to secure the ring seal 108 to the journal bearing 94 the ring seal 108 is shrink fit onto the journal bearing 94. In this exemplary embodiment, the ring seal 108 is formed of a suitable material, and is heated in a known manner to slightly expand the material forming the ring seal 108. The heated ring seal 108 is subsequently placed onto the journal bearing 94 and allowed to cool, such that the ring seal 108 contracts and engages the various surfaces of the journal earing 94 to form a compression seal 92 between the ring seal 108, and in particular the deflection ring 112 and the arm 132, and the radial portion 110 of the journal bearing 94. Once cooled, the bolts 100 can be inserted through the ring seal 108 and into the journal bearing 94 to further engage the ring seal 108 with the, journal bearing 94.

Looking now at FIG. 6, the trap 134 is defined between the outer ring 114, the outer rim 130 and the arm 132 and is shaped to enable the trap 134 to hold approximately up to 90% of the liquid metal or fluid originally present within the bearing assembly 50. This capacity allows the trap 134 to accommodate the normal amount of liquid metal that is present within the bearing assembly 50 during assembly but that is not required for proper operation of the bearing assembly 50, and which typically can leak out of the bearing assembly 50 during use. The metal fluid that leaks out of the bearing assembly 50 is directed/deflected into the trap 134 by the inner ring 112 that covers the leak pathways but allows the leaking fluid to travel into the trap 134.

The structure of the ring seal 108, and in particular the arm 132 an the trap 134, is designed to maintain an adequate seal between the ring seal 108 and the radial potion 110 of the journal bearing 94 at all different operation and non-operation conditions of the bearing assembly 50.

When the bearing assembly 50 has been assembled and is located within an x-ray tube 40 of an imaging system 10, regardless of the operation or non-operation of the bearing assembly 50, the leaking metal fluid from the leak pathways through the radial portion 110 will be deflected by the deflection ring 112 into the leak trap 134. In the situation where the entire imaging system 10 is assembled by is not in operation at all, i.e., the entire bearing assembly 50 is stationary, any liquid metal or fluid exiting the bearing assembly 50 and contained within the trap 134 will exert a pressure on the compression seal 92 formed between the shrink fit arm 132 and the radial portion 110 of the journal bearing 94. The amount of pressure exerted by the metal fluid in the trap 134 on the seal 92 is on the order of 1 psi, and operates in the direction of the arrow A in FIG. 6 which enables a compression seal having a gap or width of less than approximately 50 microns to retain the metal fluid in the trap 134. The compression seal 92 formed between the arm 132 and the radial portion 110 is formed to have a single digit micron (i.e., <10 microns) width, and thus can operate using capillary forces, as well as any anti-wetting coating applied to the complementary surfaces of the radial portion 110 and the arm 132 forming the seal 92, to retain the liquid metal within the trap 134 as the force exerted by the liquid metal is not sufficient to pass through the compression seal 92.

In the mode of operation where the gantry (not shown) housing the x-ray tube 40 and the bearing assembly 50 moves, the liquid metal that can be present within the trap 134 can exert a force on the ring seal 108 comparable to the pressure exerted on the ring seal 108 by the liquid metal in the stationary position. As such, the capillary forces and optional anti-wetting coating can retain the metal fluid within the trap 134 during movement of the gantry.

Further, in the mode of operation where the bearing assembly 50 is operated to rotate the target 48/anode 82 in order to obtain an x-ray image using the imaging system 10, the amount of liquid metal filling the trap 134 will exert a force operates in the direction of arrow B in FIG. 6. In an exemplary embodiment, this force has a magnitude of approximately 26 psi on the ring seal 108, which would allow the metal fluid to pass through a seal 92 having more than an approximately 2 micron width or gap between the components forming the seal 92. While it is possible in exemplary embodiments to secure the arm 132 of the ring seal 108 to the radial portion 110 of the journal bearing 94 with a tolerance of 2 microns, the rotation of the bearing assembly 50 exerts a force on the ligament 128 of the ring seal 108 that deflects the outer rim 130 and arm 132 away from the radial portion 110. This deflection of the outer rim 130 and arm 132 can move the arm 132 away from the radial portion 110, for example approximately 15-35 microns away from the shrink fit tolerance between the arm 132 and the radial portion 110, potentially creating a gap through, which the liquid metal could flow. However, when the bearing assembly 50 is in operation, the force exerted on the ring seal 108 by the liquid metal operates in the direction of arrow B in FIG. 6. Thus, the force from the liquid metal acts against the outer rim 130 of the ring seal 108, and not against the compression seal 92 formed by the radial portion 110 and the arm 132. As the material forming the outer rim 130 of the ring seal 108 is selected from a suitably rigid material, such as a molybdenum, and has a suitable thickness to resist this centrifugal force. In an exemplary embodiment, the thickness is at least 1.3 mm, enabling the outer rim 130 to resist this force using centrifugal forces and the stiffness of the material forming the outer rim 130 to retain the liquid metal within the trap 134. In addition, the trap 134 is formed with an undercut 136 extending into the thicker outer ring 114, which further acts to oppose the force exerted by the liquid metal within the trap 134. Thus, the stiffness of the ligament 128/outer rim 130 and outer ring 114, in conjunction with the undercut 136 in the trap 134 operate to oppose the forces of the liquid metal in the trap 134 when the bearing assembly 50 is in operation to rotate the target 48/anode 82, thereby preventing the liquid metal from exiting the ring seal 108 and entering the high voltage space or zone 87.

Thus, the ring seal 108 functions as a single structure to contain the leakage of liquid metal exiting, a bearing assembly 50 of an x-ray tube 40 during both stationary and operational conditions of the bearing assembly 50 using capillary forces when the bearing assembly 50 is stationary and centrifugal forces when the bearing assembly 50 is rotating. Further, the seal ring 108 can he mounted onto a bearing assembly 50 without altering the configuration or structure of the bearing assembly 50, thereby avoiding any need for reworking of the bearing assembly 50 and with little or no handling damage to the bearing assembly 50.

When introducing elements of various embodiments presented herein, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A liquid metal bearing assembly adapted for use with an x-ray tube, the assembly comprising:
   a. a sleeve;
   b. a shaft rotatably disposed within the sleeve; and
   c. a ring seal seated on the sleeve, the ring seal comprising:
      i. an inner deflection ring defining a central aperture through which the sleeve extends; and
      ii. an outer ring defining a ligament for retaining liquid metal leaking from the bearing assembly,
   wherein the outer ring forms a compression seal with the sleeve.

2. The bearing assembly of claim 1 wherein the ligament includes an arm extending inwardly from the outer ring.

3. The hearing assembly of claim 2 wherein the arm is joined to the outer ring by an outer rim.

4. The bearing assembly of claim 3 wherein the arm is oriented perpendicularly to the outer rim.

5. The bearing assembly of claim 1 wherein the outer ring defines a liquid trap therein.

6. The bearing assembly of claim 5 wherein the inner ring includes a number of openings through which bolts are inserted to secure the inner ring to the sleeve.

7. The bearing assembly of claim 1 wherein the seal ring is secured to the sleeve via an interference fit.

8. The bearing assembly of claim 1 wherein the seal ring is secured to the sleeve via a shrink fit.

9. The bearing assembly of claim 1 further comprising a shaft rotatably disposed within the sleeve.

10. A liquid metal bearing assembly adapted for use with an x-ray tube, the assembly comprising:
    d. a sleeve;
    e. a shaft rotatably disposed within the sleeve; and
    f. a ring seal seated on the sleeve, the ring seal comprising:
       j. an inner deflection ring defining a central aperture through which the sleeve extends; and
       iii. an outer ring defining a ligament for retaining, liquid metal leaking from the bearing assembly,
    wherein the outer ring defines a liquid trap therein, and wherein the trap includes an undercut extending into the outer ring.

11. A seal ring for use in retaining liquid metal leaking from a bearing assembly for an x-ray tube, the seal ring comprising:
    a) an inner deflection ring defining a central aperture adapted to receive a sleeve from the bearing assembly therethrough; and
    b) an outer ring adapted to engage the sleeve and including a ligament adapted to retain liquid metal leaking from the bearing assembly therein within a trap defined within the outer ring.

12. The seal ring of claim 11 wherein the trap is defined within the outer ring and the ligament.

13. The seal ring of claim 11 wherein the ligament includes an outer rim extending inwardly from the outer ring and arm extending outwardly form the outer rim opposite the outer ring.

14. The seal ring of claim 11 wherein the ligament is adapted to form a compression seal between the ligament and the bearing assembly to retain leaked liquid metal within the seal ring when the bearing assembly is stationary.

15. The seal ring of claim 11 wherein the trap is adapted to retain leaked liquid metal therein when the bearing assembly is spinning.

16. A seal ring for use in retaining liquid metal leaking from a bearing assembly for an x-ray tube, the seal ring comprising:
    a) an inner deflection ring defining a central aperture adapted to receive a sleeve from the bearing assembly therethrough; and
    b) an outer ring adapted to engaged the sleeve and including a liqament adapted to retain liquid metal leaking from the bearing assembly therein within a trap defined within the outer ring,
    wherein the ligament includes an outer rim extending inwardly from the outer ring and arm extending outwardly form the outer rim opposite the outer ring, and
    wherein the trap includes an undercut formed in the outer ring.

17. A method for forming a liquid metal bearing assembly for use in an x-ray tube, the method comprising the steps of:
    a) providing a sleeve formed a journal bearing, a spacer and a thrust bearing;
    b) placing an amount of a liquid metal bearing fluid into the journal bearing;
    c) inserting a shaft into the journal bearing;
    d) securing the spacer and the thrust bearing to the journal bearing to form a sleeve around the shaft; and
    e) securing a ring seal to the sleeve, the ring seal comprising:
       an inner deflection ring defining a central aperture through which the sleeve extends; and
       an outer ring defining a ligament for retaining liquid metal leaking from the bearing assembly,
    wherein the outer ring forms a compression seal with the sleeve.

18. The method of claim 17 wherein the step of securing the seal ring to the sleeve comprises forming an interference fit between the ring seal and the sleeve.

19. An x-ray tube comprising:
    a) a frame defining an enclosure:
    b) a cathode assembly disposed in the enclosure; and
    c) an anode assembly disposed in the enclosure spaced from the cathode assembly, wherein the anode assembly comprises:
       i. a sleeve containing an amount of liquid metal therein;
       ii. a shaft rotatably disposed within the sleeve:
       iii. a ring seal engaged with the sleeve and adapted to retain leaking liquid metal therein when the shaft rotates within the sleeve and when the shaft is
       iv. an anode target operably connected to the sleeve,
    wherein the ring seal includes a trap adapted to retain the liquid metal within the ring seal while the shaft rotates and a ligament that forms a compression seal with the sleeve to retain the liquid metal therein while the shaft is stationary.

* * * * *

UNITED STATES PATENT AND TRADEMARK OFFICE
CERTIFICATE OF CORRECTION

PATENT NO. : 10,533,608 B2
APPLICATION NO. : 15/426879
DATED : January 14, 2020
INVENTOR(S) : Ian Strider Hunt et al.

It is certified that error appears in the above-identified patent and that said Letters Patent is hereby corrected as shown below:

In the Claims

Claim 10, Column 13, Line 33, Delete "d." and substitute therefore -- a. --;

Claim 10, Column 13, Line 34, Delete "e." and substitute therefore -- b. --;

Claim 10, Column 13, Line 35, Delete "f." and substitute therefore -- c. --;

Claim 10, Column 13, Line 37, Delete "j." and substitute therefore -- i. --;

Claim 10, Column 13, Line 37, Delete "iii." and substitute therefore -- ii. --;

Claim 10, Column 13, Line 39, After "retaining" delete ",";

Claim 13, Column 13, Line 58, Delete "form" and substitute therefore -- from --;

Claim 16, Column 14, Line 15, Delete "liqament" and substitute therefore -- ligament --;

Claim 17, Column 14, Line 25, After "formed" insert -- of --;

Claim 19, Column 14, Line 53, After "is" insert -- stationary within the sleeve; and --.

Signed and Sealed this
Second Day of March, 2021

Drew Hirshfeld
*Performing the Functions and Duties of the
Under Secretary of Commerce for Intellectual Property and
Director of the United States Patent and Trademark Office*